Dec. 15, 1925.  1,565,244
R. C. ANGELL
TOOTH MOUNTING CARD HOLDER
Filed April 12, 1922    2 Sheets-Sheet 1
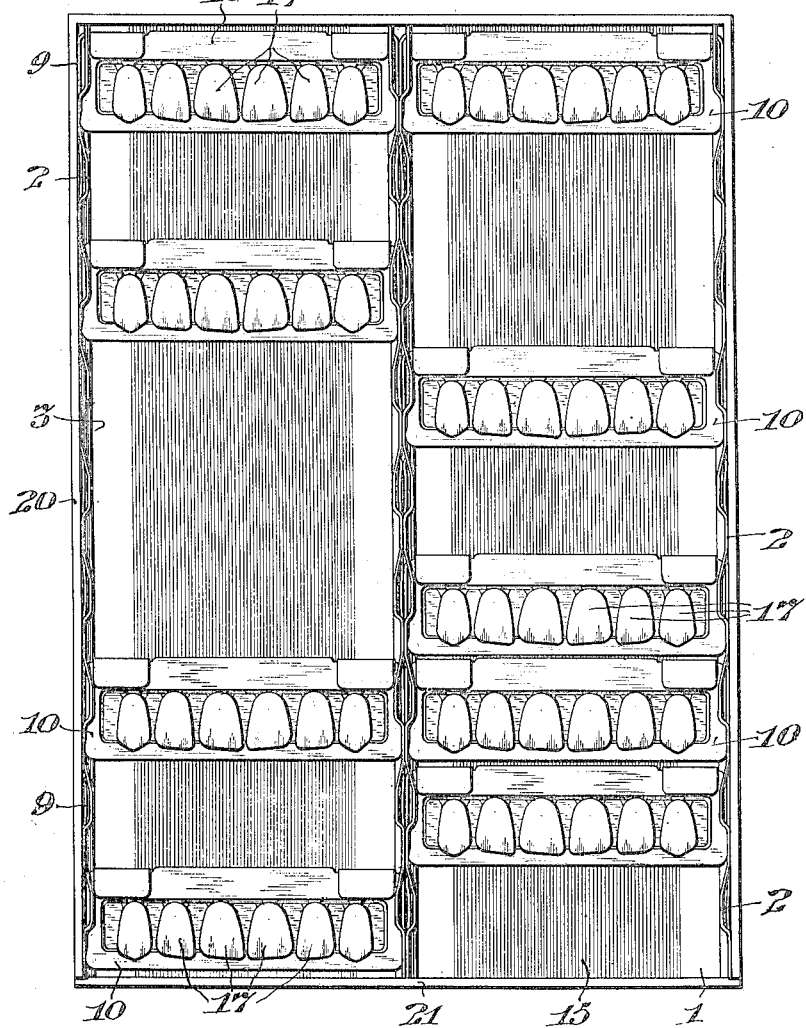
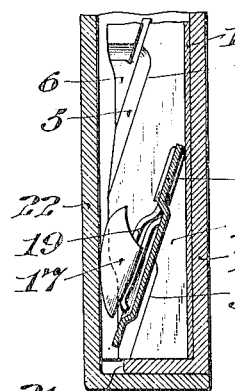
Inventor
Robert C. Angell,
By Clifton G. Hallowell
Attorney Dec. 15, 1925.
R. C. ANGELL
1,565,244
TOOTH MOUNTING CARD HOLDER
Filed April 12, 1922   2 Sheets-Sheet 2
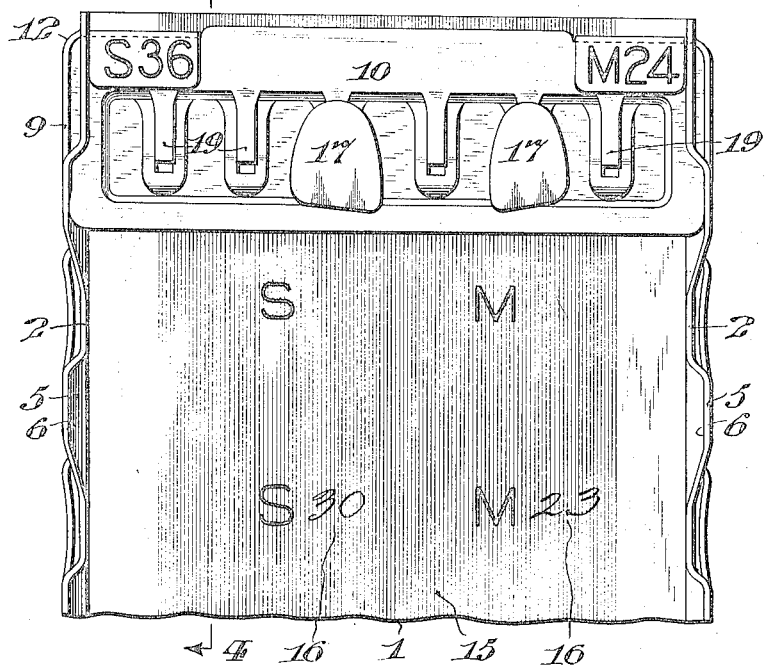
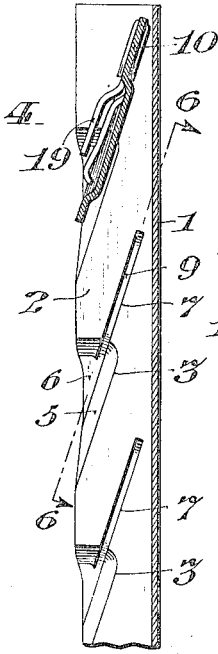
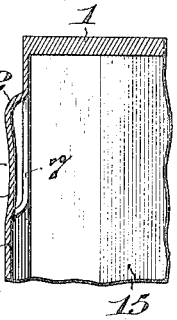
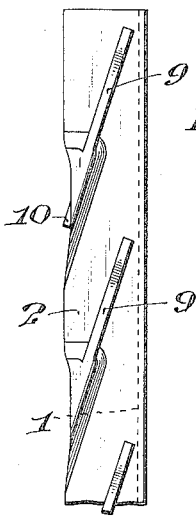
Inventor
Robert C. Angell,
By Clifton E. Hallowell
Attorney Patented Dec. 15, 1925.

1,565,244

UNITED STATES PATENT OFFICE.

ROBERT C. ANGELL, OF PRINCE BAY, NEW YORK, ASSIGNOR TO THE S. S. WHITE DENTAL MANUFACTURING COMPANY, A CORPORATION OF PENNSYLVANIA.

TOOTH-MOUNTING-CARD HOLDER.

Application filed April 12, 1922. Serial No. 551,929.

*To all whom it may concern:*

Be it known that I, ROBERT C. ANGELL, a citizen of the United States, and a resident of Prince Bay, in the county of Richmond, State of New York, have invented certain new and useful Improvements in Tooth-Mounting-Card Holders, of which the following is a specification, reference being had to the accompanying drawings.

My invention relates particularly to that class of holders in which the tooth mounting-cards may be carried for transportation and display, and from which they may be conveniently withdrawn and replaced.

The principal objects of my invention are to provide an efficient and inexpensive rack that may be stamped from sheet material, to form guides arranged to slidably support tooth mounting-cards, and having frictional means tending to retain said tooth mounting-cards therein and thereby prevent their accidental displacement.

Other objects of my invention are to provide a rack having guides for the tooth mounting-cards so obliquely inclined as to facilitate the convenient removal and replacement of individual tooth mounting-cards, and to provide means affording stops arranged to so limit the inward movement of said tooth mounting-cards as to space them uniformly in said rack.

My invention further comprehends a rack for tooth mounting-cards affording a plane wall which is so treated as to provide an inscribing surface affording a space convenent to make notations thereon, indicating the character of the teeth of such tooth mounting-cards as may be removed therefrom, or out of stock.

Further objects of my invention are to provide a closure package or envelope for tooth mounting-cards, so formed as to not interfere with the free manipulation of said tooth mounting-cards, and having a removable lid or closure so spaced with respect to said rack as to provide a retainer for said cards and the teeth mounted thereon, whereby they are so held as to prevent them from being jarred out of place in shipment or handling.

The form of my invention, as hereinafter described, comprises a rack, preferably formed of a blank of sheet metal, having its lateral margins upturned into relatively parallel planes, and forming side walls in normal relation to the base wall of said rock, and punched to form opposed pockets arranged to receive the end margins of the tooth mounting-cards, and merging into slots obliquely inclined with respect to the base wall of said rack, and having spring guards frictionally engaging the ends of said tooth mounting-cards.

My invention also includes all of the various novel features of construction and arrangement as hereinafter more definitely specified.

In the accompanying drawings, Figure 1 is a front elevational view of two tooth mounting-card racks shown in an envelope or casing, with the lid or closure removed and including several tooth mounting-cards promiscuously disposed and having teeth thereon; Fig. 2 is an enlarged fragmentary sectional view, showing the lower left-hand corner of the envelope, with its lid or closure, and the tooth mounting-card rack disposed therein; Fig. 3 is a fragmentary front elevational view, on an enlarged scale, of the upper portion of the tooth mounting-card rack, showing a single tooth mounting-card mounted therein in its uppermost position; Fig. 4 is a fragmentary longitudinal sectional view of the tooth mounting-card rack shown in Fig. 3, and taken on the line 4—4 in said figure; Fig. 5 is a fragmentary side elevational view, showing the upper portion of the tooth mounting-card rack as viewed from the right-hand side of Fig. 3, and Fig. 6 is a fragmentary sectional view of the tooth mounting-card rack taken through the pocket and slot on the line 6—6 in Fig. 4.

In said figures the tooth mounting-card rack is formed of a blank of sheet material, preferably metal, and comprises the base wall 1, from which the lateral margins of the blank are upturned to provide the side walls 2. As best shown in Figs. 3, 4 and 5, the side walls 2 are stamped or punched to provide opposed recessed pockets 3, each having the beveled wall 5 and recessed wall 6, and merging into the slot 7, from which the narrow strip or web is punched to form a guard 9 extending over said slot in spaced relation therewith, and connecting the recessed wall 6 of said pocket with the side wall 2 of the rack at the termination of said slot.

As shown in Figs. 4 and 5, the pockets 3 and slots 7 afford inclined guides for the tooth mounting-cards 10, and are so inclined in relatively parallel planes as to facilitate the convenient removal and replacement of any one of the individual tooth mounting-cards without interference with the others that may be held in said rack.

As shown in Figs. 3 and 6, the web or narrow strip forming the guard 9 is sharply curved as at 12 where it joins the side wall 2 and terminates the slot 7, to provide a stop for limiting the inward movement of the tooth mounting-cards 10 entered into the guides formed by the pockets 3 and slots 7. Said guards 9 are slightly curved or sprung inward as shown at 13, to so yieldingly engage the end edges of the tooth mounting-cards 10, as to prevent their accidental displacement from the rack, but permit them to be conveniently and readily removed and replaced, or otherwise manipulated.

The rack has the inner face of its base wall 1, provided with a longitudinally extending region, so etched or otherwise treated, as to afford a convenient inscribing surface 15, upon which notations 16 relating to the shade or mold numbers or other data relating to the teeth carried by the tooth mounting-cards may be inscribed. As shown in Fig. 3 said surface 15 may preferably have the symbols "S" representing shade, and "M" representing mold permanently impressed thereon as indicated.

It will be obvious that the tooth mounting-cards are so frictionally engaged in the guides provided therefor in the rack, that they may be readily withdrawn and replaced as a whole when desired, and that the teeth 17 may be individually removed and replaced from the tangs 19 of the tooth mounting-card 10 without displacing said tooth mounting-card as a whole.

As shown in Fig. 1, the tooth mounting-card racks may be conveniently embodied in a suitably formed envelope or casing 20 which, as shown in said figure, is arranged to contain two of said tooth mounting-card racks disposed side by side, it being understood, however, that said casing may be provided for one, two or more of said racks as desired.

The casing 20 has its end wall 21 cut away or reduced, as best shown in Fig. 2, so as not to interfere with the removal or replacement of the adjacent tooth mounting-card 10, while the rack is held in said casing. Said casing 20 is also provided with a closure 22, which so closely overlies the teeth 17 on the mounting-cards held in the tooth mounting-card racks, as to retain them against accidental displacement by jarring while in transit or handling.

It may be here noted that the racks thus formed may be shipped in the casing 20 and retained therein for display, or they may be removed from said casing and placed in suitable containers such as suitably provided drawers or other convenient receptacles.

I do not desire to limit my invention to the precise details of construction and arrangement as herein set forth, as it is obvious that various modifications may be made therein without departing from the essential features of my invention as defined in the appended claims.

Having thus described my invention, I claim:

1. A holder of the class described, comprising a rack having side walls provided with opposed recessed pockets merging into obliquely inclined slots affording guides arranged to receive and hold tooth mounting-cards in relatively parallel planes, the recessed walls of said pockets being extended to form yielding guards arranged to frictionally engage the opposite ends of said tooth mounting-cards.

2. A holder of the class described, comprising a rack formed of a blank of sheet material having its lateral margins upturned to provide side walls, and stamped to form opposed pockets merging into obliquely inclined guides arranged to receive the end margins of tooth mounting-cards.

3. A holder of the class described, comprising a rack formed of a blank of sheet material having its lateral margins upturned to provide side walls, and stamped to form opposed pockets merging into obliquely inclined slots forming guides flanked by yielding guards and arranged to receive the end margins of tooth mounting-cards with the end frictionally engaged with said guards.

4. A holder of the class described, comprising a rack formed of a blank of sheet material having its lateral margins upturned to provide side walls punched to provide obliquely inclined slots forming guides arranged to receive the end margins of tooth mounting-cards, and having the webs punched from said slots extended in spaced relation thereto to afford guard tending to frictionally retain said tooth mounting-cards in said guides.

5. A holder of the class described, comprising a rack formed of a blank of sheet material having its lateral margins upturned to provide side walls punched to form obliquely inclined guiding slots terminating in opposed recessed pockets the recessed walls of said pockets being extended with the web punched from said slots to afford lateral guards, with which the ends of tooth mounting-cards inserted in said slots may be frictionally engaged.

6. A holder of the class described, comprising a rack formed of a blank of sheet material, having its lateral margins upturned to provide side walls stamped or punched to form obliquely inclined guiding slots terminating in opposed beveled pockets, each affording a recessed wall connected by the narrow web punched from said slot, with said side wall at the inner end of said slot, and providing lateral guards and stops for the tooth mounting-cards inserted in the guides formed by said slots.

In witness whereof, I have hereunto set my hand this 5th day of April, A. D., 1922.

ROBERT C. ANGELL.